United States Patent [19]

Barnes et al.

[11] Patent Number: 5,373,931
[45] Date of Patent: Dec. 20, 1994

[54] CONVEYOR BELT CLEANING ARRANGEMENT

[75] Inventors: Edwin A. Barnes; Glenn Skelton, both of New South Wales, Australia

[73] Assignee: Belle Banne Flexco Pty Limited, Sydney, Australia

[21] Appl. No.: 66,550

[22] Filed: May 24, 1993

[30] Foreign Application Priority Data

May 22, 1992 [AU] Australia .............. 17110/92

[51] Int. Cl.⁵ .............................. B65G 45/00
[52] U.S. Cl. ................................. 198/499
[58] Field of Search ............... 198/497, 499; 15/256.5, 15/256.51

[56] References Cited

U.S. PATENT DOCUMENTS

| | | | |
|---|---|---|---|
| 4,643,293 | 2/1987 | Swinderman | 198/497 |
| 4,838,409 | 6/1989 | Rappen | 198/497 |
| 5,310,042 | 5/1994 | Veenhof | 198/499 |

FOREIGN PATENT DOCUMENTS 449142  5/1974 Australia.
615383  9/1991 Australia.

Primary Examiner—Joseph E. Valenza
Attorney, Agent, or Firm—Allegretti & Witcoff, Ltd.

[57] ABSTRACT

An integrally formed conveyor belt cleaning head (10) formed of a resilient material includes a substantially transversely extending cleaning tip portion (11). At least two integrally formed and substantially parallel, integrally spaced apart elongate arms (12) extend outwardly therefrom, substantially perpendicular to the transverse cleaning tip portion (11). The arms (12) extend into a substantially transverse base portion (14) which is adapted to engage with and/or be mounted to resilient mounting pad (18). Elongate reinforcing shoulders (19) extend at least partway along each of the arms (12).

4 Claims, 4 Drawing Sheets

CONVEYOR BELT CLEANING ARRANGEMENT

BACKGROUND OF THE INVENTION

The present invention relates to a conveyor belt cleaning arrangement and more particularly, to a conveyor belt cleaning arrangement for effectively removing residue and extraneous matter from and as may be attached or adhered to, a conveyor belt—for example, the return run of a conveyor belt.

Conveyor belts are used in many industries, such as, for example, mining and manufacturing, and during use have extraneous matter attached or adhered thereto. Thus, it is known to provide cleaning arrangements such as scrapers, which usually operate in association with the return runs of such conveyors, to remove or at least substantially minimize the presence of, excess matter or residue which has been adhered to or become attached to the conveyor belt. Many known cleaning arrangements for conveyor belts include scraping portions or tips which are mounted relative to the return run of a conveyor belt (usually below the return run and extending substantially transversely relative to the longitudinal axis of the conveyor belt) so that the tip will come into contact with the return run of the conveyor belt and thereby remove extraneous matter or residue.

One such arrangement is known from Australian patent specification No. 449,142. A further arrangement is known from our Australian patent specification No. 615,383, which combines the use of a spray with a scraper means, to remove excess or extraneous matter from the return run of a conveyor belt.

In many arrangements known and used up until this time, the cleaning head or tip of the cleaning arrangement has been formed of a metal material and has had a hard wearing metal tip (such as, for example, a tungsten tip) attached thereto. It has previously been found that this is effective in removing excess or extraneous matter from a conveyor belt. In such arrangements it is usual for the cleaning arrangement to be mounted below the return run of a conveyor belt and/or relative to the head/pulley end of a conveyor, and for the metal tips to be mounted on a transversely extending metal plate which in turn is usually mounted to spaced apart metal uprights or arms. However, in order for the cleaning heads or tips to follow the contours of a travelling conveyor belt, it is necessary to give the cleaning arrangements a degree of resilience in all directions. Further, it is necessary for the arrangements to have such resilience given that the cleaning heads or tips can come into contact with hard matter adhered to the belts, which will cause shocks or stresses to be applied to the cleaning arrangements. Thus, in some known arrangements such metal supporting arms are mounted to resilient pads which thereby impart a degree of resilience and flexibility to the cleaning arrangements when they come into contact with extraneous matter and the like, and which also allow for stresses and/or tension to be absorbed (at least to a certain extent) and/or dissipated.

In other known arrangements springs are used in association with the metal support arms and metal cleaning heads, to impart resilience and flexibility thereto.

Such know arrangements have however caused many problems. For example, many conveyor belts have sections which are spliced together with metal splicing. Thus, when the metal tips of the cleaning arrangement come into contact with such splicing, this can cause problems and catching between the splicing and the metal cleaning tips. Further, if there is a catch between these components, or if the metal cleaning tips come into contact with some apparently immovable matter adhered to the belt, the metal tips do not have sufficient flexibility or resilience, and the metal arms to which they are attached will often become bent. This in turn can cause the bent arms and bent tip to engage with the belt such as to tear or rip the belt material. This often causes substantial problems and expense, in so far as equipment replacement is concerned and in so far as operational "down-time" is concerned.

It is also know to provide a conveyor cleaning arrangement which is fixedly mounted below a conveyor belt, and which has an elongate arm into which is slidably engaged a plastics cleaning member of a unitary formation, having a cleaning head portion at an upper end thereof, and the lower end of which slidably engages within a mounting shaft extending below the return run of a conveyor belt. Such an arrangement has an elongate bore extending therethrough, supposedly to impart resilience to the cleaning arrangement. However, this unitary cleaning arrangement has not been found to be successful. Generally speaking, it has insufficient resilience and flexibility.

It is therefore an object of the present invention to go at least some way towards overcoming or at least minimizing the problems outlined above.

It is a further object of the present invention to provide a straightforward and efficient cleaning arrangement for use with conveyor belts.

Other objects of this invention will become apparent from the following description.

SUMMARY OF THE PRESENT INVENTION

According to one aspect of this invention, there is provided an integrally formed conveyor belt cleaning head formed of a resilient material, including a substantially transversely extending cleaning tip portion; integrally formed, substantially parallel, spaced apart, elongate arms extending outwardly and substantially perpendicular therefrom; said arms extending into a substantially transversely extending base portion, which is adapted to engage with and/or be mounted to resilient mounting means; and elongate reinforcing shoulders extending at least part way along each of said arms.

BRIEF DESCRIPTION OF THE DRAWING

The invention will now be described by way of example only and with reference to the accompanying drawings, wherein.

DETAILED DESCRIPTION OF PREFERRED EMBODIMENTS OF THE PRESENT INVENTION

The present invention will now be described with reference to the accompanying drawings, and by way of example only.

Figure 1:
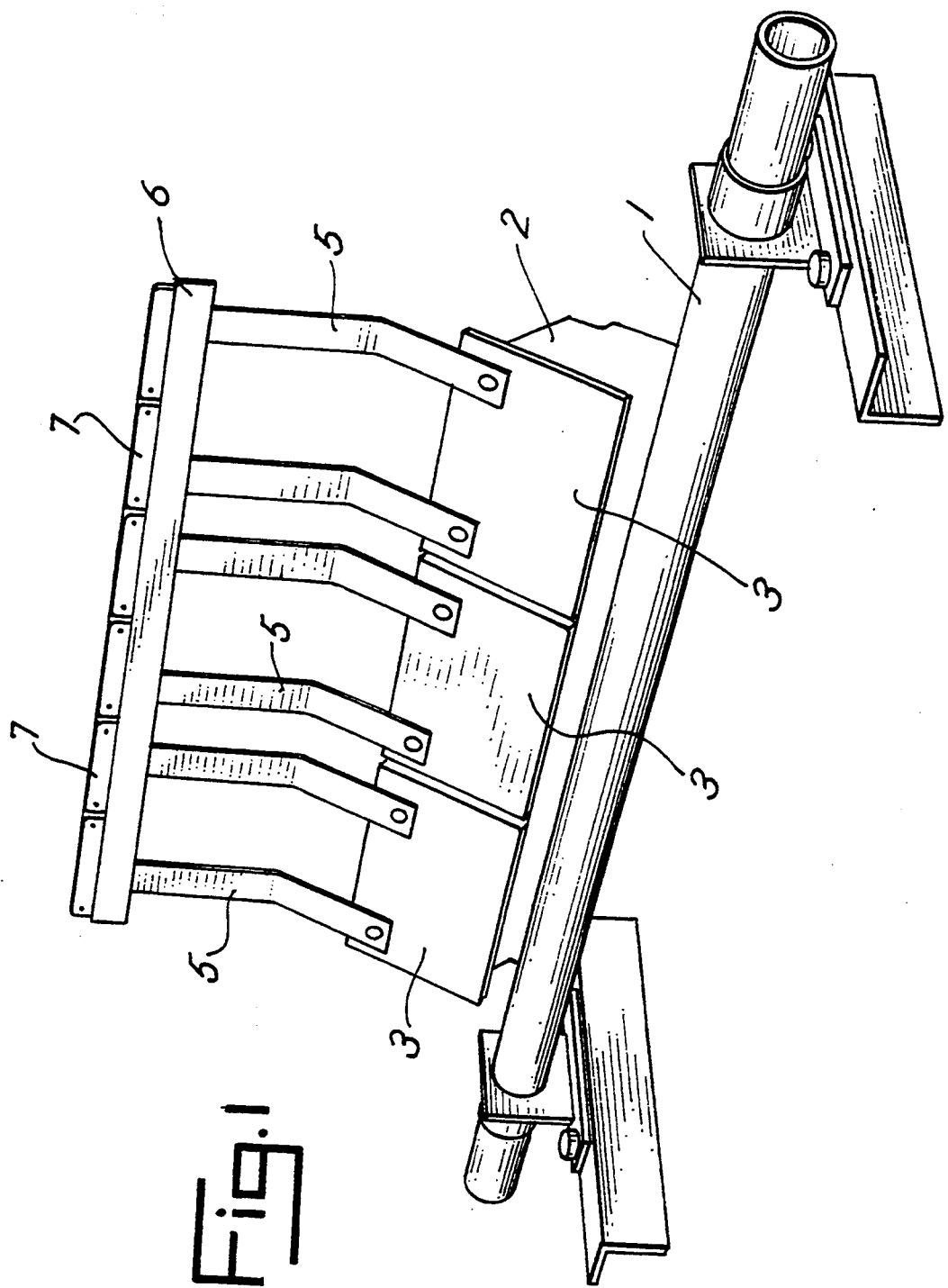
FIG. 1 is a general view of one form of a cleaning arrangement known and used up until this time.

As referred to hereinbefore, numerous forms of conveyor belt cleaning arrangements have been known up until this time. One known arrangement (shown by way of example in FIG. 1 of the drawings) includes a substantially elongate mounting bar or rod 1 which is positioned below the return run of a conveyor belt (the rod extending substantially transversely of the longitudinal axis of the conveyor belt), and/or relative to the head/pulley end of a conveyor. One or more pads 2 of a resilient material are mounted to the transverse mounting rod 1 and to these are attached (such as by bolting, bonding, molding or the like) to one or more plates 3. These plates are normally formed of a metal material. Extending upwardly from each plate are laterally spaced apart and preferably angled or "dog-legged" arms 5 formed of a metal material. A transverse, elongate upper strip or metal plate 6 extends between upper ends of the arms 5, and to this plate 6 can be attached (in a replaceable manner) cleaning tips 7 such as metal tungsten tips and the like. Some of the problems associated with such arrangements, especially when there is metal to metal contact between the cleaning tips 7 and, for example, metal splicing of a belt, have already been discussed. Further, when there is interference between the cleaning tips and the conveyor belt and/or matter adhered thereto, the metal arms 5 can bend and come into contact with the conveyor belt material so as to rip it. It has already been pointed out that this can be expensive both from the point of view of material replacement and from the point of view of operational "downtime" and inconvenience.

Figure 2:
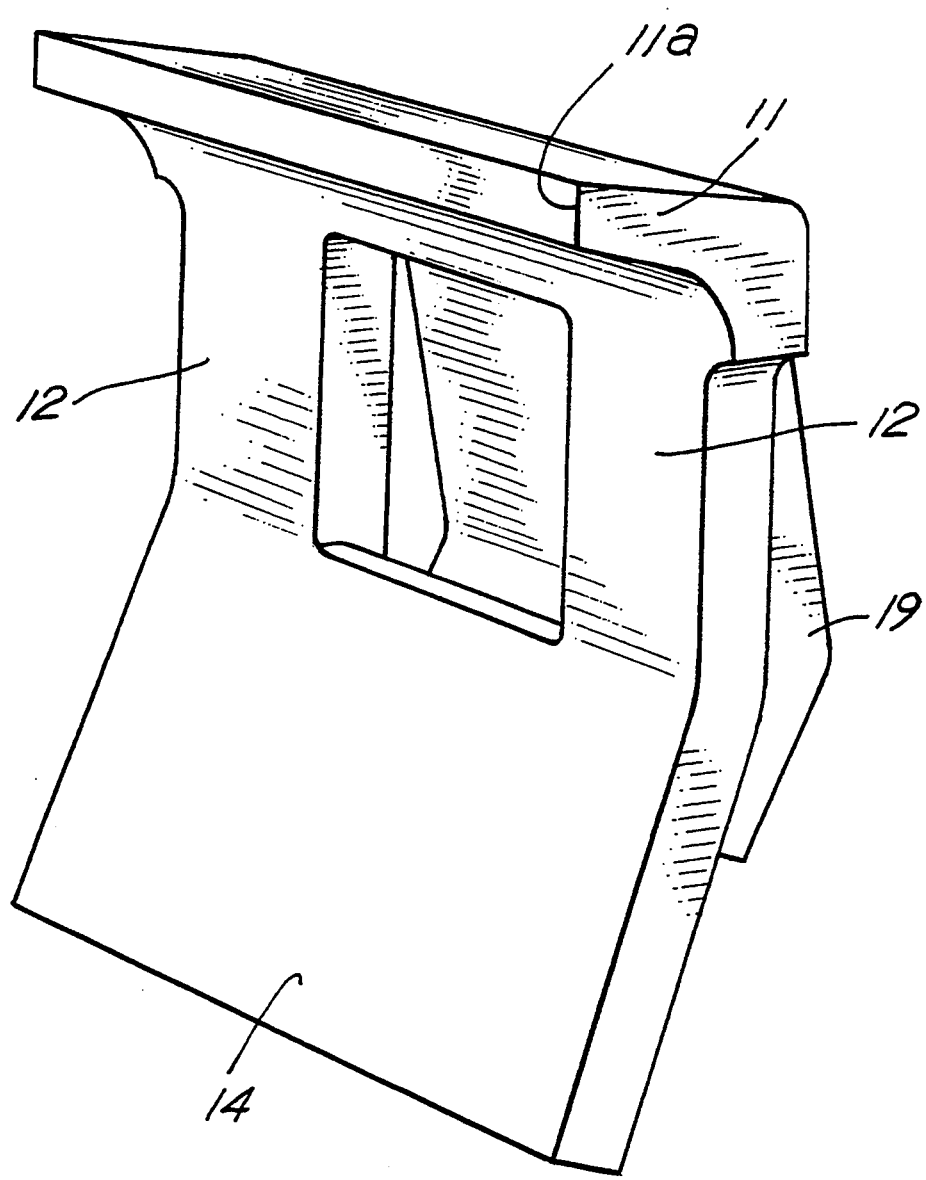
FIG. 2 is a general front perspective view of a cleaning head according to one form of the present invention.
Figure 3:
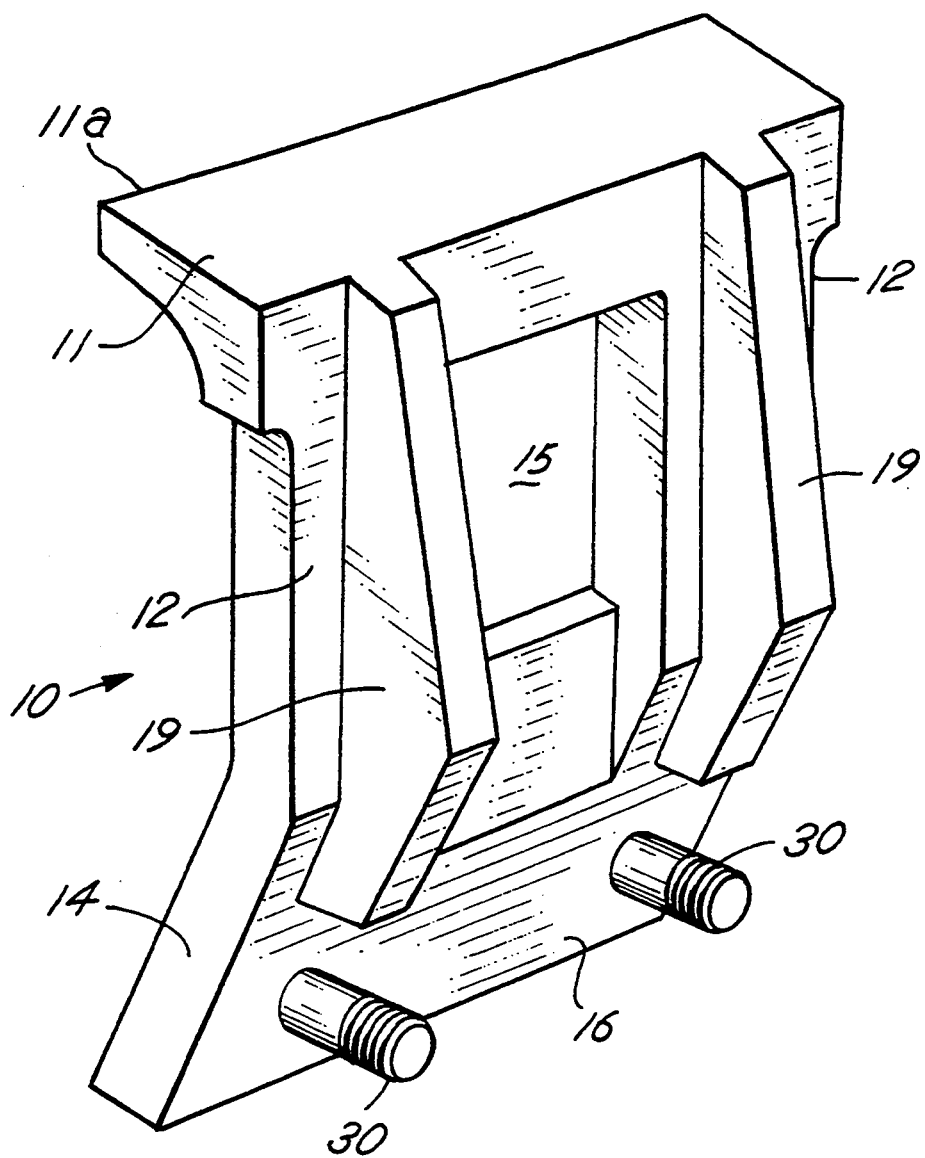
FIG. 3 is a general rear perspective view of a cleaning head according to one form of the present invention.
Figure 4:
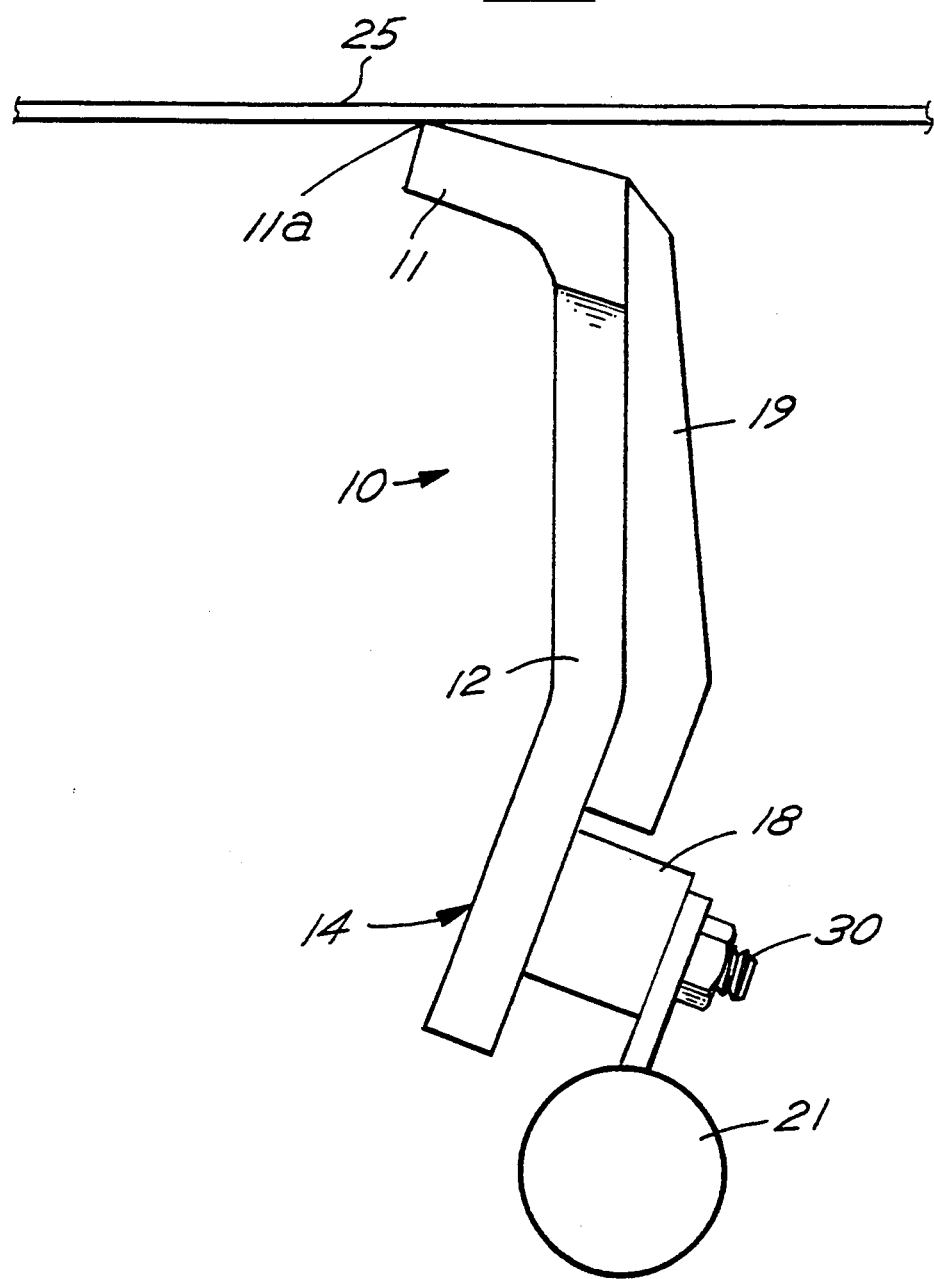
FIG. 4 is a general view of a conveyor cleaning arrangement according to the present invention in use relative to a conveyor belt according to one form of the present invention.

The present invention provides a cleaning head 10, essentially as shown in FIGS. 2 through 4 of the accompanying drawings, which is preferably formed of a plastics material, such as, for example, a polyurethane material. The present invention will be described with reference to the cleaning head being constructed of an appropriately reinforced polyurethane material, although it should be appreciated that the use of other plastics and resilient materials, having inherent features of resilience and flexibility, can be utilized.

The cleaning head 10 of the present invention includes an upper substantially transverse cleaning tip portion 11, which has an angled leading edge 11a adapted for contact with the underside and/overhead/pulley end of a conveyor belt (as shown by way of example, with reference to FIG. 4 of the drawings) and which is of a thickness to impart resilience and flexibility to the cleaning arrangement.

Extending outwardly from the underside of the cleaning tip portion 11 are provided at least two elongate and laterally spaced apart arms 12, which are preferably cranked or "dog-legged", at least part way along the length thereof, and which extend into a substantially transversely extending base portion 14. Because of the angled or "dog-legged" formation of the arms 12, the transverse base portion 14 is at an angle relative to the cleaning tip portion 11. The laterally spaced apart elongate arms 12 are preferably substantially perpendicular to the longitudinal axis of the transverse tip portion 11 and define a recess 15 therebetween. The arms 12 are preferably dog-legged or cranked so that when the base portion 14 is attached to a pad of resilient material (as will be described hereinafter), the tip portion 11 will be correctly angled and positioned relative to the underside of the return run of a conveyor belt.

The rear side 16 of the base portion 14 is preferably provided with appropriate means 30 (such as bolts and the like) to allow it to be securely engaged with a mounting arm and/or plate 17 and preferably one or more pads of resilient material 18, as generally shown in and as hereinafter described with reference to FIG. 4 of the accompanying drawings.

Further, the outer rear surfaces of the arms 12 are provided with elongate reinforcing ribs or shoulders 19, which extend at least part way along the arms 12 and which, in a preferred form of the invention, extend from a reverse side of the cleaning tip portion 11 to a position immediately adjacent a join between the lower ends of the arms 12 and the transverse base portion 14, the ribs or shoulders 19 running substantially parallel to the longitudinal axes of the arms 12. These reinforcing ribs or shoulders 19 have been found in use to substantially strengthen the arms 12 and to absorb stresses and strengthen the arms from such stresses, when the cleaning head 10 of the present invention (and in particular the cleaning tip 11) come into contact with matter adhered to the conveyor belt. This then allows such shocks and stresses to be absorbed and dissipated by the cleaning head 10 of the present invention, and this, together with the resilience of the mounting of the cleaning head 10, avoids or substantially minimizes the problems associated with arrangements known up until this time. Certainly, there is no metal to metal contact and no ripping of the belts, as has been occasioned up until this time. It has also been found that if there are extreme shocks, stresses and/or pressures, the arms 12 are likely to break at, for example, the join between the arms 12 and the base portion 14, but there will be no metal bending, or bending of arms 12, which has caused problems, and the ripping of belts up until this time.

In a preferred form of the invention, the arms 12, reinforcing shoulders 19 and base portion 14 are formed of a harder polyurethane material than the cleaning tip portion 11, to allow as much resilience or flexibility to the cleaning tip portion as possible. The components are however all integrally formed or molded, so as to provide an efficient, unitary and integral cleaning head 10.

The particular formation of the present invention has been found to have substantial operational uses, as compared with the known metal arrangements used up until this time and as compared with the solid plastic arrangements which have not had the advantages as found to be inherent in the present invention.

Referring now to FIG. 4 of the accompanying drawings, when the cleaning head 10 of the present invention is mounted in position, the base portion 14 is attached to or mounted on appropriate resilient material 18, so as to impart resilience to the cleaning head 10. It will be appreciated however that the polyurethane plastic material of the cleaning head 10 of the present invention has inherent features of resilience and flexibility, and that the polyurethane material of the cleaning tip 11 will avoid the metal to metal contact and at least minimize problems associated therewith, as detailed hereinbefore.

Referring to FIG. 4 of the accompanying drawings, this shows (in side view and by way of example only) a cleaning head 10 of the present invention attached to a pad of resilient material 18, and it will be appreciated that the cranked or "dog-leg" formation of the legs 11 allows for the base portion 14 to be appropriately attached or mounted onto a transverse mounting bar 21 and flexible pad of material 18, and for the cleaning tip portion 11 of the head 10 to be then held in position at a desired angle relative to the return run of a conveyor belt 25, to allow for the cleaning thereon and the removal of excess or extraneous matter. As will be appreciated from FIG. 4 of the drawings, the mounting bar 21 and head 10 extend transversely below the conveyor belt, and preferably transverse relative to the longitudinal axis of the return run of a conveyor belt 25. This is however by way of example only and the mounting bar 21 and head 10 can also be suitably mounted or adjacent the head/pulley end of a conveyor.

It should be appreciated that in use, a plurality of cleaning heads 20 can be mounted side-by-side along a bar or mounting rod 21 below a conveyor belt 25. Alternatively, one or more cleaning heads 10 can be mounted in any desired position relative to a conveyor belt, to clean or remove excess or extraneous matter therefrom. Further, and if desired, the present invention can be used in associated with a spray arrangement such as that described in our Australian patent specification No. 615,383.

It should be appreciated that the present invention has been described by way of example only and that improvements and modifications may be made thereto without departing from the scope of the invention as defined by the appended claims.

We claim:

1. An integrally formed conveyor belt cleaning head formed of a resilient material and including a transversely extending cleaning tip portion for cleaning contact with said conveyor belt; laterally spaced apart and substantially parallel elongate arms extending outwardly and substantially perpendicular from said cleaning tip portion, said laterally spaced apart arms extending into a substantially transversely extending base portion engaged with or mounted to a resilient or flexible mounting; and elongate reinforcing shoulders extending at least partway along each of said laterally spaced apart arms.

2. A conveyor belt cleaning head as claimed in claim 1, wherein said arms and said base portion are formed of a harder resilient material than said cleaning tip portion.

3. A conveyor belt cleaning head as claimed in claim 1 or claim 2, formed of a reinforced polyurethane material.

4. A conveyor belt cleaning arrangement, including a plurality of conveyor belt cleaning heads resiliently and flexibly mounted on an elongate shaft spaced apart below and/or relative to a return run and/or head end of a conveyor belt, so as to extend substantially transversely of the longitudinal axis of said conveyor belt; said cleaning heads being formed of a resilient material and each of said cleaning heads including a substantially transversely extending cleaning tip portion; at least two integrally formed and laterally spaced apart, substantially parallel elongate arms extending outwardly and substantially perpendicular from each said cleaning tip portion and extending into a substantially transversely extending base portion resiliently and flexibly mounted to said elongate shaft; elongate reinforcing shoulders extending at least partway along each of said laterally spaced apart elongate arms.

* * * * *